(12) United States Patent
Lewkowicz et al.

(10) Patent No.: US 6,975,467 B1
(45) Date of Patent: Dec. 13, 2005

(54) METHOD AND APPARATUS FOR HIGH FLY WRITE DETECTION IN A DISK DRIVE

(75) Inventors: Julian Lewkowicz, Lafayette, CO (US); Larry J. Koudele, Broomfield, CO (US)

(73) Assignee: Maxtor Corporation, Longmont, CO (US)

( * ) Notice: Subject to any disclaimer, the term of this patent is extended or adjusted under 35 U.S.C. 154(b) by 322 days.

(21) Appl. No.: 09/976,669

(22) Filed: Oct. 11, 2001

Related U.S. Application Data

(60) Provisional application No. 60/239,509, filed on Oct. 11, 2000.

(51) Int. Cl.[7] ............................................. G11B 27/36
(52) U.S. Cl. .......................................... 360/31; 360/75
(58) Field of Search .................................... 360/31, 75

(56) References Cited

U.S. PATENT DOCUMENTS

| | | | |
|---|---|---|---|
| 3,979,775 A | 9/1976 | Schwarz | 360/113 |
| 4,146,911 A | 3/1979 | Gyi et al. | 360/75 |
| 4,669,011 A | 5/1987 | Lemke | 360/103 |
| 4,703,378 A | 10/1987 | Imakoshi et al. | 360/113 |
| 4,777,544 A | 10/1988 | Brown et al. | 360/75 |
| 4,835,757 A * | 5/1989 | Abiko | 369/53.17 |
| 4,841,389 A | 6/1989 | Hoyt et al. | 360/75 |
| 4,933,783 A | 6/1990 | Yasui | 360/67 |
| 4,937,689 A | 6/1990 | Seaver et al. | 360/78.07 |
| 5,082,827 A | 1/1992 | Barnes | 505/1 |
| 5,130,866 A | 7/1992 | Klaassen et al. | 360/75 |
| 5,168,413 A | 12/1992 | Coker et al. | 360/137 |
| 5,260,836 A | 11/1993 | Yada et al. | 360/32 |
| 5,309,295 A | 5/1994 | Bailey et al. | 360/66 |
| 5,339,207 A | 8/1994 | Moon et al. | 360/77.05 |
| 5,377,058 A | 12/1994 | Good et al. | 360/75 |
| 5,410,439 A | 4/1995 | Egbert et al. | 360/75 |
| 5,412,519 A | 5/1995 | Buettner et al. | 360/73.03 |
| 5,436,773 A | 7/1995 | Hanson | 360/66 |

(Continued)

OTHER PUBLICATIONS

U.S. Appl. No. 09/905,604, filed Jul. 13, 2001, Moline et al.

*Primary Examiner*—David Hudspeth
*Assistant Examiner*—Daniell L. Negrón
(74) *Attorney, Agent, or Firm*—Tejpal S. Hansra

(57) ABSTRACT

A method and apparatus for detecting a high fly write condition in a disk drive is disclosed. Amplitudes of automatic gain control (AGC) fields are used in connection with determining whether a high fly write condition exists in a disk drive, since the amplitude of an AGC field read by a head is generally related to the flying height of the head. In one embodiment, a calibration process is performed to obtain average amplitudes of AGC fields on a zone-by-zone basis for a head associated with a disk surface. These average amplitudes of AGC fields are then stored onto the disk surface for later use. When a write operation is to be performed, the head measures the amplitude of the AGC field associated with a data sector onto which a block of data is to be stored. The measured amplitude of the AGC field is compared to the average amplitude of the AGC fields for the zone associated with the AGC field being read. If the difference between the measured amplitude of the AGC field and the average amplitude for the AGC fields for the zone is outside of a certain tolerance, a high fly write condition may exist. Accordingly, data written during a high fly write condition may be rewritten when the flying height has returned to normal or some other remedial action may be taken.

43 Claims, 3 Drawing Sheets

U.S. PATENT DOCUMENTS

| | | | |
|---|---|---|---|
| 5,446,601 A | 8/1995 | Fukuta | 360/46 |
| 5,461,517 A | 10/1995 | Suda et al. | 360/53 |
| 5,589,996 A | 12/1996 | Patrick et al. | 360/73.03 |
| 5,631,891 A | 5/1997 | Moritsugu et al. | 369/124 |
| 5,677,808 A | 10/1997 | Cha et al. | 360/78.07 |
| 5,760,983 A | 6/1998 | Cowen | 360/48 |
| 5,808,825 A * | 9/1998 | Okamura | 360/75 |
| 5,831,781 A * | 11/1998 | Okamura | 360/31 |
| 5,909,330 A | 6/1999 | Carlson et al. | 360/31 |
| 5,918,001 A * | 6/1999 | Ueno et al. | 714/8 |
| 6,014,282 A | 1/2000 | Ito | 360/75 |
| 6,049,440 A * | 4/2000 | Shu | 360/77.04 |
| 6,088,176 A | 7/2000 | Smith et al. | 360/46 |
| 6,104,557 A | 8/2000 | Kasai et al. | 360/46 |
| 6,104,563 A | 8/2000 | Dovek et al. | 360/68 |
| 6,130,793 A | 10/2000 | Ohmori et al. | 360/53 |
| 6,216,242 B1 | 4/2001 | Schaenzer | 714/723 |
| 6,249,393 B1 | 6/2001 | Billings et al. | 360/31 |
| 6,266,199 B1 | 7/2001 | Gillis et al. | 360/31 |
| 6,275,029 B1 * | 8/2001 | Schaff | 324/212 |
| 6,351,341 B1 | 2/2002 | Lee et al. | 360/75 |
| 6,411,458 B1 | 6/2002 | Billings et al. | 360/75 |
| 6,452,735 B1 | 9/2002 | Egan et al. | 360/31 |
| 6,671,110 B2 * | 12/2003 | Baba et al. | 360/31 |
| 6,678,102 B1 | 1/2004 | Liikanen et al. | 360/31 |
| 6,687,081 B1 | 2/2004 | O'Hara et al. | 360/78.07 |

* cited by examiner

METHOD AND APPARATUS FOR HIGH FLY WRITE DETECTION IN A DISK DRIVE

CROSS-REFERENCE TO RELATED APPLICATION

Priority is claimed from U.S. Provisional Patent Application Ser. No. 60/239,509 filed Oct. 11, 2000, which is incorporated by reference herein in its entirety.

FIELD OF THE INVENTION

The present invention relates to computer disk drives. More particularly, the present invention relates to a method and apparatus for detecting high fly write conditions in a computer disk drive.

BACKGROUND OF THE INVENTION

Computer disk drives store information on magnetic disks. Typically, the information is stored on each disk in concentric tracks, divided into sectors. Information is written to and read from a disk by a head (or transducer), which is mounted on an actuator arm capable of moving the head radially over the disk. Accordingly, the movement of the actuator arm allows the head to access different tracks. The disk is rotated by a spindle motor at a high speed, allowing the head to access different sectors on the disk. The head may include separate or integrated read and write elements.

In a typical computer disk drive, the head generally rides above the surface of the disk on a cushion of air that is created by the movement of the disk under the head. The distance of the head from the surface of the magnetic disk is known as the flying height of the head. It is important to maintain the flying height of the head within a desired range. For example, if the head flies at too low a height, it is more likely to come into contact with the magnetic disk causing a loss of stored data. It is also important to ensure that the head does not fly at too great a height. When the head is consistently at too great a distance from the magnetic disk, the head is said to be in a "high flying" condition. A "high fly write condition" occurs when the head is suddenly at too great a height from the disk to reliably perform write operations.

There are many reasons why a high flying condition may occur. For example, the head may strike a particle on the disk surface causing a temporary change in the flying height of the head. As another example, a particle may become attached to the head which causes the aerodynamic characteristics of the head (more properly, its slider) to change such that the flying height increases.

Data written to a magnetic storage disk for storage while a head is experiencing a high fly write condition may be lost. This is because the strength of the magnetic field generated by the write element decreases exponentially with distance. Accordingly, where the head is at too great a distance from the surface of the magnetic disk (e.g., during a high fly write event), the magnetic field produced may not be strong enough to induce the desired magnetic transitions in the storage disk. Therefore, it is important to detect a high fly write event in a computer disk drive, so that data written during a high fly write condition may be rewritten when the flying height has returned to normal or so that some other remedial action may be taken.

In prior disk drive systems, in order to verify that data was properly written to a disk surface (e.g., to ensure that data was not written during a high fly write condition), a relatively inefficient process was used. That is, data to be stored onto the disk surface would be provided to the write element and the write element would write the data onto the disk surface in the form of magnetic polarity transitions. After the write operation was completed, the disk would make a complete revolution and the information written onto the disk surface would be read. The data recovered from the disk surface was then compared with the original data to be stored onto the disk surface to verify that it matched.

While the aforementioned method provided an accurate way of detecting situations where data was not properly written onto the disk surface, it was very slow. In fact, such a method is not acceptable for modern disk drive performance requirements.

Accordingly, it would be advantageous to provide an accurate method and apparatus for detecting high fly write conditions in a relatively efficient manner. Furthermore, it would be advantageous to provide such a method and apparatus that can be implemented at an acceptable cost and that is reliable in operation.

SUMMARY OF THE INVENTION

The present invention is designed to minimize the aforementioned problems and meet the aforementioned, and other, needs.

Amplitudes of automatic gain control (AGC) fields are used in connection with determining whether a high fly write condition exists in a disk drive. More specifically, the amplitude of an AGC field read by a head is generally related to the flying height of the head.

In one embodiment, a calibration process is performed to obtain average amplitudes of AGC fields on a zone-by-zone basis for a head associated with a disk surface. These average amplitudes of AGC fields are then stored onto the disk surface for later use.

After the disk drive has been turned on, the average amplitudes of the AGC fields are read from the disk surface and are stored in memory. When a write operation is to be performed, the head measures the amplitude of the AGC field associated with a data sector onto which a block of data is to be stored. The measured amplitude of the AGC field is compared to the average amplitude of the AGC fields for the zone associated with the AGC field being read. If the difference between the measured amplitude of the AGC field and the average amplitude for the AGC fields for the zone is outside of a certain tolerance, a high fly write condition may exist. Accordingly, data written during a high fly write condition may be rewritten when the flying height has returned to normal or some other remedial action may be taken.

In one embodiment, upon detection of a high fly write condition, another attempt is made to write data onto the disk surface. In such case, the disk makes one complete revolution and a measurement is again taken of the amplitude of the AGC field to see if the difference between it and the average amplitude of the AGC fields for the zone is within the certain tolerance.

In one embodiment, upon detection of a high fly write condition, a burnishing process is performed. The burnishing process may include moving the head back and forth between an inner diameter and outer diameter of the disk surface while the head contacts the disk surface due to a slowing of the spindle motor.

In one embodiment, a running average of amplitudes of a predetermined number of AGC fields may be maintained on a zone-by-zone basis. In such case, a comparison is made between the measured AGC field associated with the data sector onto which a block of data is being written and the running average for the zone associated with the data sector. If the difference between the measured AGC field and the running average is outside a certain tolerance, a high fly write condition may exist.

Other objects, features, embodiments and advantages of the invention will be apparent from the following specification taken in conjunction with the following drawings.

DETAILED DESCRIPTION OF THE PREFERRED EMBODIMENT

Figure 1:
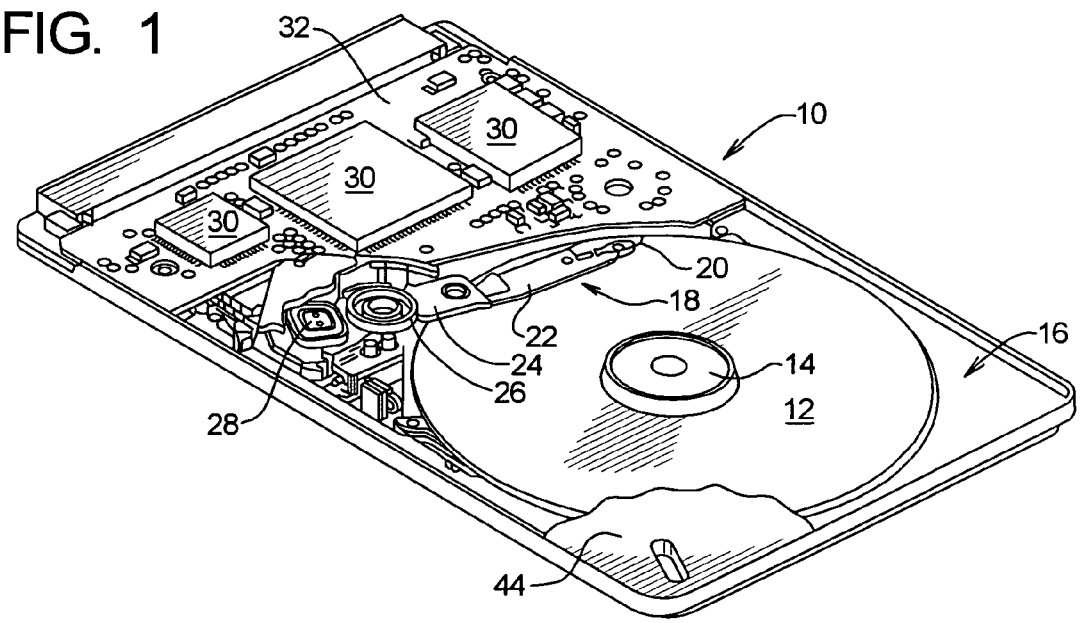
FIG. 1 is a diagrammatic representation of a disk drive in which the present invention may be implemented.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

A disk drive 10 with which the present invention may be used is illustrated in FIG. 1. The disk drive comprises a disk 12 that is rotated by a spin motor 14. The spin motor 14 is mounted to a base plate 16.

The disk drive 10 also includes an actuator arm assembly 18 having a head 20 (or transducer) mounted to a flexure arm 22, which is attached to an actuator arm 24 that can rotate about a bearing assembly 26 that is attached to the base plate 16. The actuator arm 24 cooperates with a voice coil motor 28 in order to move the head 20 relative to the disk 12. The spin motor 14, voice coil motor 28 and head 20 are coupled to a number of electronic circuits 30 mounted to a printed circuit board 32. The electronic circuits 30 typically include a read channel chip, a microprocessor-based controller and a random access memory (RAM) device.

It should be understood that the disk drive 10 may include a plurality of disks 12 and, therefore, a plurality of corresponding actuator arm assemblies 18. It should also be understood that the principles described herein are equally applicable to such disk drives.

Figure 2:
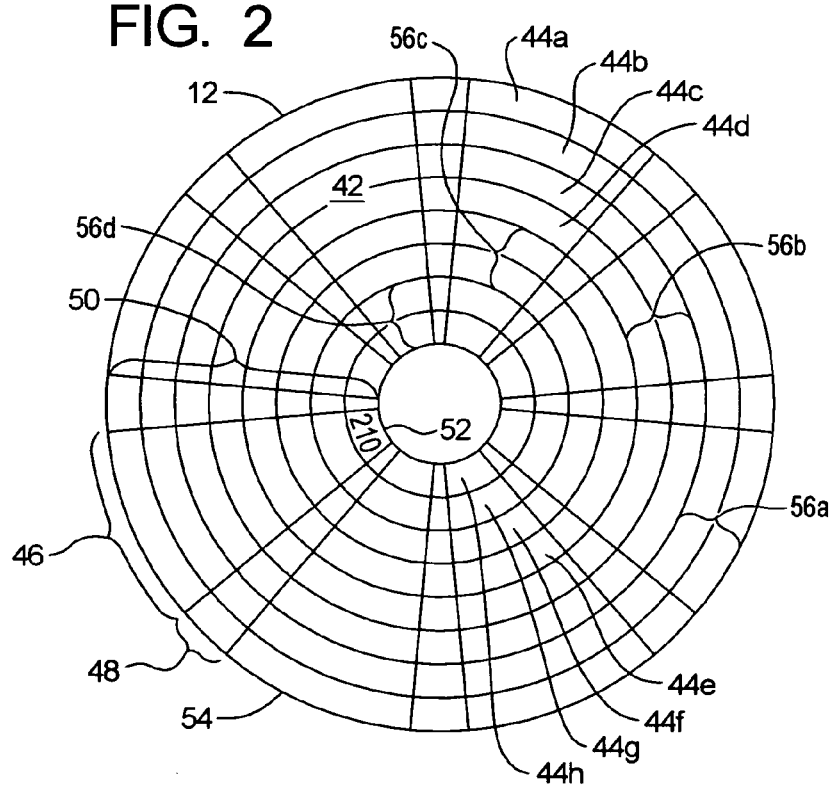
FIG. 2 is a diagrammatic representation illustrating a disk surface which has been formatted to be used in conjunction with a sectored servo system and which is used in connection with an embodiment of the present invention.

FIG. 2 is a diagrammatic representation of a simplified top view of a disk 12 having a surface 42 which has been formatted to be used in conjunction with a sectored servo system (also known as an embedded servo system). As illustrated in FIG. 2, the disk 12 includes a plurality of concentric tracks 44a–44h for storing data on the disk's surface 42. Although FIG. 2 only shows a relatively small number of tracks (i.e., 8) for ease of illustration, it should be appreciated that typically many thousands of tracks are included on the surface 42 of a disk 12.

Each track 44a–44h is divided into a plurality of data sectors 46 and a plurality of servo sectors 48. The servo sectors 48 in each track are radially aligned with servo sectors 48 in the other tracks, thereby forming servo wedges 50 which extend radially across the disk 12 (e.g., from the disk's inner diameter 52 to its outer diameter 54).

As shown in FIG. 2, a plurality of zones 56a–56d may be formed from groupings of tracks. While the figure shows zones comprised of an equal number of tracks, it should be understood that each zone does not have to include the same number of tracks. Furthermore, the disk surface 42 may be divided into many more or less zones than the number of zones illustrated in the figure. Even further, for purposes of the present invention, a zone may include a single track instead of a grouping of tracks.

Figure 3:
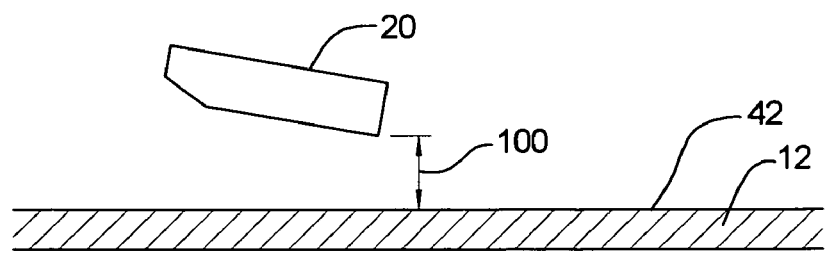
FIG. 3 is a diagrammatic representation of a sectional view of a disk and an associated head illustrating the flying height of the head above the disk surface.

With reference now to FIG. 3, a diagrammatic representation of a sectional view of a disk 12 and a head 20 is illustrated. As shown in FIG. 3, during operation, the head 20 (which, as illustrated, includes a slider) is raised above the disk surface 42 by a spacing 100 known as the flying height of the head 20. The spacing 100 is created by the interaction between air currents above the surface of the disk 12 caused by rotation of the disk 12 and the aerodynamic qualities of the slider of the head 20.

Figure 4:
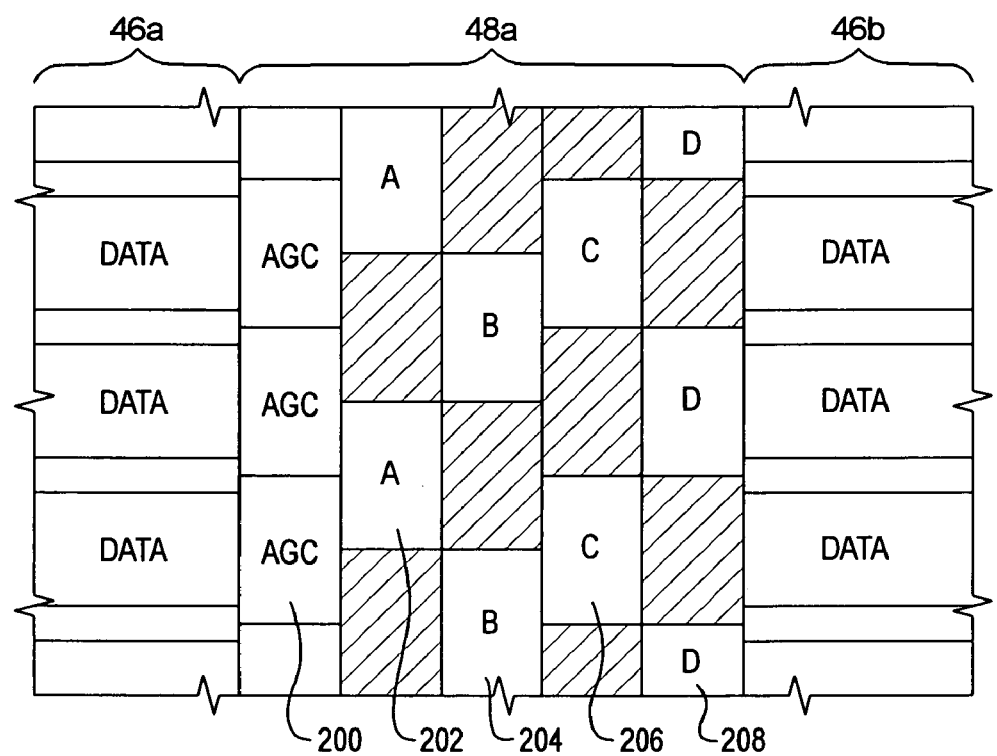
FIG. 4 is a diagrammatic representation of a portion of information on a disk surface used in connection with an embodiment of the present invention.

FIG. 4 is a diagrammatic representation of informational content of a portion of a disk surface 42. As illustrated in FIG. 4, the disk surface 42 includes data sectors 46a and 46b separated by a servo sector 48a containing positioning information.

Servo sector 48a includes a plurality of automatic gain control (AGC) fields 200, along with A, B, C and D servo bursts 202, 204, 206 and 208. As is well-understood by those skilled in the art, servo sector 48a also generally includes a synch burst and gray code, both of which are not shown in the figure.

AGC fields 200 extend radially across the disk surface 42 from an inner diameter 52 to an outer diameter 54. Generally, each AGC field 200 contains a signal of calibrated strength or amplitude. As the head 20 passes over the AGC field 200, the amplitude of AGC signal read by the head is monitored. This amplitude is used to adjust the gain imparted to other signals read by the head 20 (e.g., A, B, C and D bursts 202, 204, 206 and 208, respectively).

The inventors of the present invention have observed that the amplitude of the AGC field is generally based upon the flying height of the head 20. Accordingly, the inventors have used such information in determining whether a high fly write condition exists.

In an embodiment of the present invention, there are two main processes for determining whether a high fly write condition exists. First, a calibration process is performed as shown in the flowchart depicted in FIG. 5. Specifically, after servo sectors 48 have been written onto the disk surface 42 (step 500), the head 20 is used to measure the amplitude of AGC fields 200 associated with different zones 56a–56d on the disk surface. Accordingly, a counter N is initialized with a value of 1 (step 510) and the amplitudes of the AGC fields 200 in zone N are measured (step 520). Next, the amplitudes of the AGC fields 200 for zone N are averaged and stored in memory (step 530). Then, a determination is made as to whether amplitudes of AGC fields 200 for any additional zones need to be measured (step 540).

If there are additional zones, the counter N is incremented (step 550) and steps 520, 530 and 540 are repeated. If there are no more zones, the average amplitudes of the AGC fields for each zone are stored on the disk surface 42 (step 560), preferably, in a utility sector 210 (see FIG. 2). As will be more fully understood from the explanation below, these average values are used to determine whether a high fly write condition exists.

Figure 5:
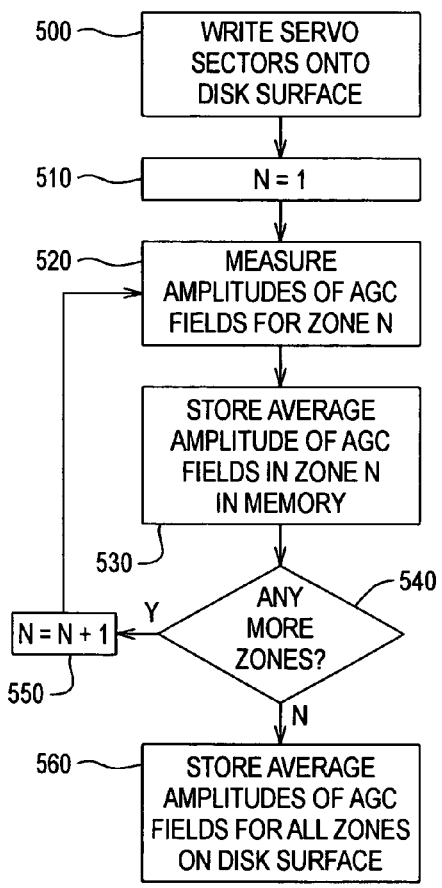
FIG. 5 is a simplified flow diagram illustrating one manner of performing a calibration technique used in an embodiment of the present invention; and, FIG. 6 is a simplified flow diagram illustrating one manner of performing a high fly write detection and recovery technique used in an embodiment of the present invention.

Preferably, the process shown in FIG. 5 is performed during the self-test procedure. However, the process may be performed any time after servo sectors 48 have been written onto the disk surface 42, as indicated in step 500.

It should be understood that the amplitudes all of the AGC fields in a zone do not need to be averaged. Instead, amplitudes of a representative sample of AGC fields in a zone may be averaged to expedite the calibration process.

It should also be understood that average amplitudes of AGC fields are taken on a zone-by-zone basis in order to accommodate for changes in bit density across the disk surface 42. That is, the amplitude of an AGC field at the inner diameter 52 of the disk surface 42 may be different than the amplitude of an AGC field at the outer diameter 54 of the disk surface 42 due to differences in bit density.

Furthermore, if a disk drive includes multiple disk surfaces 42, the calibration process shown in FIG. 5 should be performed for each disk surface 42 on a zone-by-zone basis. Furthermore, if more than one head 20 is used for a disk surface 42, the calibration process should also be performed for each head 20.

Figure 6:
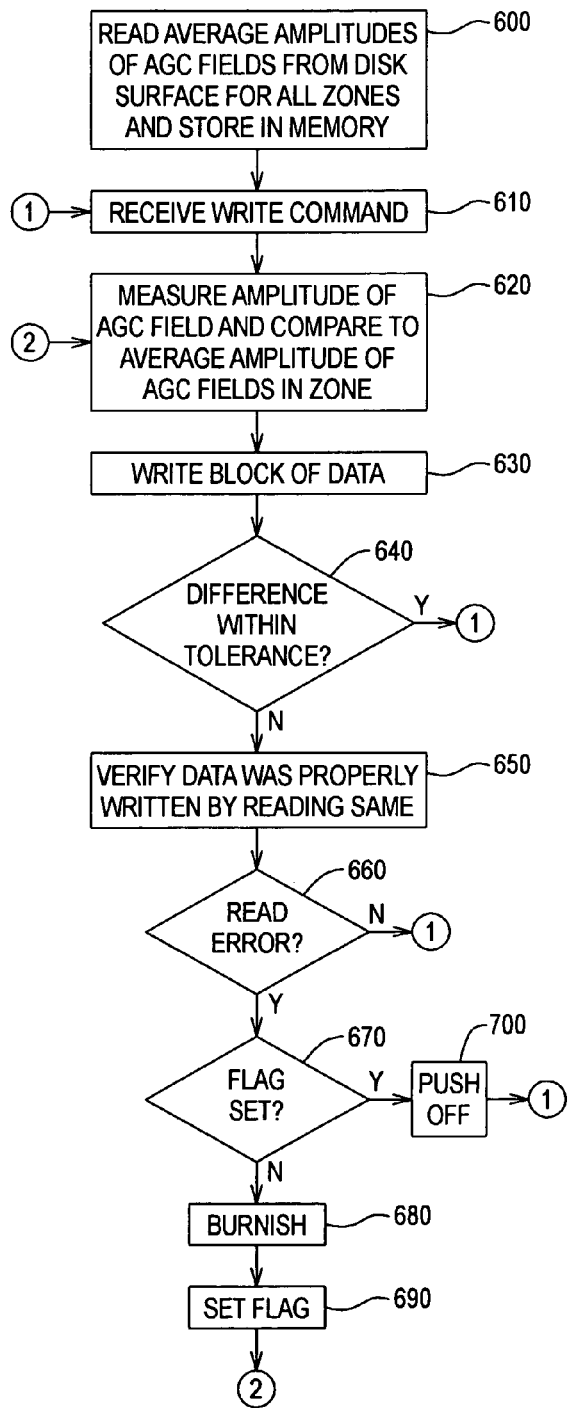

FIG. 6 is a flow chart of the operation of the second main process of determining whether a high fly write condition exists for an embodiment of the present invention. Specifically, after the disk drive is turned on, the head 20 reads the average amplitudes of the AGC fields for all zones which were stored on the disk surface 42 in step 560 of FIG. 5 and the average amplitudes are then stored in memory (step 600).

At some point, a write command is received (step 610), which indicates a block of data in a data buffer (not shown) is to be written onto the disk surface 42. As is well-understood by those skilled in the art, prior to writing data onto the disk surface 42, one or more servo sectors 48 must be read by the head 20.

Specifically, head 20 reads the servo sector 48 immediately preceding the data sector 46 in which the block of data is to be stored. As part of reading the servo sector 48, the amplitude of the servo sector's AGC field 200 is measured (step 620). Furthermore, the measured amplitude of the AGC field 200 is compared to the average amplitude of the AGC fields 200 (now stored in memory) for the zone associated with the servo sector 48 (also in step 620). While (or slightly after) the comparison is being made, the block of data is then written onto the disk surface 42 (step 630).

If the difference between the measured amplitude of the AGC field and the average amplitude of the AGC fields for the zone is within a certain tolerance, a high fly write condition is presumed not to exist (step 640). Steps 610, 620 and 630 are repeated when the next block of data is to be written. It should be noted that the tolerance may be determined experimentally, by modelling or through use of the Wallace equation.

If the difference between the measured amplitude of the AGC field and the average amplitude of the AGC fields for the zone is outside of a certain tolerance, a high fly write condition may exist (step 640). Accordingly, a verification process is performed, whereby the written data is read from the disk surface 42 to make sure it was properly written (step 650). As will be appreciated by those skilled in the art, the verification process will require the disk to spin at least one revolution after the data has been written.

If no read errors exist, the data is presumed to have been written properly and the process returns to step 610 (step 660). However, if a read error exists, then a determination is made as to whether a high fly write flag has been set (step 670).

If the high fly write flag has not been set, a burnishing process is performed in an effort to dislodge any particles from the head 20 or to knock off any particles that may be on the disk surface 42 (step 680). Among other things, the burnishing process may include moving the head 20 back and forth between the inner diameter 52 and the outer diameter 54 while the head 20 contacts the disk surface 42 due to a slowing of the spindle motor 14. In addition, the high fly write flag is set (step 690).

After the burnishing process has been performed and the high fly write flag has been set, steps 620, 630 and 640 are repeated. If a high fly write condition continues to persist (i.e., the difference between the measured amplitude of the AGC field and the average amplitude of the AGC fields for the zone is outside of a certain tolerance (step 640); and, after the verification process is performed (step 650), read errors continue (step 660)) and the high fly write flag has been set (step 670), then the block of data is pushed off (step 700). That is, the block of data is attempted to be written to either a different sector on the disk surface 42 or on an altogether different disk surface 42 using a different head 20.

Although not initially mentioned above, it should be noted that the high fly write flag may be cleared in step 610. Thus, for the embodiment shown in FIG. 6, a block of data would not be pushed off until the burnishing process was attempted at least once.

It should be understood, however, that some of the steps in the flowchart of FIG. 6 may be eliminated or performed in a different order. Furthermore, instead of performing the verification process (step 650 and step 660) only once, the verification process may be repeated a predetermined number of times (e.g., five times). If no read errors are found during any one of the predetermined number of verifications, the process returns to step 610.

In one embodiment, instead of (or in addition to) performing the verification process, if the difference between the measured amplitude of the AGC field and the average amplitude of the AGC fields for the zone was outside of a certain tolerance, another attempt would be made to write the information onto the disk surface 42. That is, the disk would make one complete revolution and a measurement would again be taken of the amplitude of the AGC field to see if the difference between it and the average amplitude of the AGC fields for the zone was within a certain tolerance. This process could be performed a number of times in hopes of, for example, dislodging a particle stuck to the head or moving a particle located on the disk surface which has been causing the high fly write condition.

Because AGC fields 200 extend radially across the disk, they are written in a piecemeal fashion and are "stitched" together. Ideally, portions of the AGC fields 200 being stitched together are in-phase with one another (i.e., perfectly radially coherent). However, in some instances, portions of the AGC fields 200 being stitched together may be out-of-phase with one another. In a worst case situation, when portions of AGC fields 200 that are being stitched together are 180 degrees out-of-phase with one another and the center of the head 20 passes over the intersection of such portions of the AGC fields, a cancelling occurs, such that the strength of the AGC field is reduced. Thus, it may appear as though a high fly write condition exists. Furthermore, if one AGC field on a track exhibits a reduced amplitude due to radial incoherence, often other AGC fields on the same track may also exhibit a reduced amplitude. (This is termed a local media defect.)

In order to account for AGC fields which are not written in a radially coherent manner, an embodiment of the present invention makes use of a running average of amplitudes of AGC fields. Specifically, the average amplitudes of the AGC fields 200 for each zone are used as initial values. However, as the head 20 reads amplitudes of AGC fields in a particular zone, a running average is maintained.

In one embodiment, the running average may be made of X samples, where X is a predetermined number. For example, if X=4, the running average would include the averages of the last 4 amplitudes of AGC fields read by the head 20 (i.e., the 4 most current amplitudes). Thus, in step 620 of FIG. 6, the measured amplitude of the next AGC field would be compared to the running average. Preferably, the running average would be kept in memory.

While reference has been made to an average value of AGC fields (e.g., whether it be a running average or an average by zone) with which a comparison is made, it should be understood that, instead, a comparison may be made with a threshold value, among other things. For example, a threshold value may be calculated using the average value of AGC fields in a zone and subtracting an experimentally determined tolerance value. Other variations will readily come to mind to those skilled in the art.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:
   providing a disk surface that is divided into a plurality of zones, the disk surface having a head associated therewith;
   measuring amplitudes of a plurality of automatic gain control (AGC) fields in a first of said plurality of zones;
   storing a calibrated value, which is based upon the measured amplitudes, onto the disk surface for use in determining whether a high fly write condition exists in the first of said plurality of zones;
   receiving a write command to write a block of data in the first of said plurality of zones;
   measuring an amplitude of an AGC field in the first of said plurality of zones in response to the write command;
   comparing the measured amplitude to the calibrated value;
   determining whether the measured amplitude is within a predetermined tolerance in comparison to the calibrated value;
   writing the block of data onto the disk surface in a data sector associated with the AGC field in the first of said plurality of zones before the disk surface completes one revolution after measuring the measured amplitude regardless of whether the measured amplitude is within the predetermined tolerance; and,
   reading the block of data written onto the disk surface after the disk surface completes the one revolution and before the disk surface completes two revolutions after measuring the measured amplitude and performing a write verification on the block of data read from the disk surface if the measured amplitude is outside of the predetermined tolerance.

2. The method of claim 1 including the step of:
   re-measuring the amplitude of the AGC field in the first of said plurality of zones if the measured amplitude is outside of the predetermined tolerance in comparison to the calibrated value.

3. The method of claim 2 including the steps of:
   re-writing the block of data onto the disk surface in the data sector associated with the AGC field in the first of said plurality of zones; and,
   determining whether the re-measured amplitude is within the predetermined tolerance in comparison to the calibrated value.

4. The method of claim 3 including the step of:
   writing the block of data to a different data sector on the disk surface only after a burnishing operation has been performed in connection with attempting to write the block of data.

5. The method of claim 3 including the step of:
   determining whether a high fly write flag has been set if the re-measured amplitude is outside of the predetermined tolerance in comparison to the calibrated value.

6. The method of claim 5 including the step of:
   performing a burnishing process by allowing the head to contact the disk surface, if the high fly write flag has not been set.

7. The method of claim 5 including the step of:
   setting the high fly write flag.

8. The method of claim 5 including the step of:
   writing the block of data to a different data sector on the disk surface if the high fly write flag has been set.

9. The method of claim 5, including the steps of:
   providing a second disk surface; and,
   writing the block of data to a data sector on the second disk surface.

10. The method of claim 1, wherein said calibrated value is an average of the measured amplitudes.

11. The method of claim 1, wherein said calibrated value is stored in a utility sector on the disk surface.

12. The method of claim 1, wherein the steps of claim 1 are performed during a self-test procedure.

13. The method of claim 1, wherein the first of said plurality of zones is a single track.

14. The method of claim 1 including the step of:
   performing a burnishing process by allowing the head to contact the disk surface if the measured amplitude is outside of the predetermined tolerance in comparison to the calibrated value.

15. The method of claim 1 including the step of:
   verifying that the block of data written onto the disk surface was properly written when the measured amplitude is outside of the predetermined tolerance in comparison to the calibrated value.

16. The method of claim 15 including the step of:
   performing a burnishing process by allowing the head to contact the disk surface if the block of data written onto the disk surface could not be verified as being properly written.

17. The method of claim 1, including writing the block of data onto the disk surface in the data sector while comparing the measured amplitude to the calibrated value.

18. The method of claim 1, including writing the block of data onto the disk surface in the data sector after comparing the measured amplitude to the calibrated value.

19. The method of claim 1, including writing the block of data onto the disk surface in the data sector slightly after comparing the measured amplitude to the calibrated value.

20. The method of claim 1, wherein the calibrated value is used as an initial value for a running average of amplitudes of AGC fields within the first of said plurality of zones.

21. The method of claim 20, wherein the running average is made up of a predetermined number of samples of amplitudes of AGC fields within the first of said plurality of zones.

22. The method of claim 21, wherein the first of said plurality of zones is a single track.

23. The method of claim 21 including the steps of:
receiving a write command to write a block of data in the first of said plurality of zones;
measuring an amplitude of an AGC field in the first of said plurality of zones in response to the write command; and,
comparing the measured amplitude to the running average.

24. The method of claim 23 including the steps of:
writing the block of data onto the disk surface in a data sector associated with the AGC field in the first of said plurality of zones; and,
determining whether the measured amplitude is within a predetermined tolerance in comparison to the running average.

25. The method of claim 24 including the step of:
performing a burnishing process by allowing the head to contact the disk surface if the measured amplitude is outside of the predetermined tolerance in comparison to the running average.

26. The method of claim 24 including the step of:
verifying that the block of data written onto the disk surface was properly written if the measured amplitude is outside of the predetermined tolerance in comparison to the running average.

27. The method of claim 26 including the step of:
performing a burnishing process by allowing the head to contact the disk surface if the block of data written onto the disk surface could not be verified as being properly written.

28. The method of claim 24 including the step of:
re-measuring the amplitude of the AGC field in the first of said plurality of zones if the measured amplitude is outside of the predetermined tolerance in comparison to the running average.

29. The method of claim 28 including the steps of:
re-writing the block of data onto the disk surface in the data sector associated with the AGC field in the first of said plurality of zones; and,
determining whether the re-measured amplitude is within the predetermined tolerance in comparison to the running average.

30. The method of claim 29 including the step of:
determining whether a high fly write flag has been set if the re-measured amplitude is outside of the predetermined tolerance in comparison to the running average.

31. The method of claim 30 including the step of:
performing a burnishing process by allowing the head to contact the disk surface, if the high fly write flag has not been set.

32. The method of claim 30 including the step of:
setting the high fly write flag.

33. The method of claim 30 including the step of:
writing the block of data to a different data sector on the disk surface if the high fly write flag has been set.

34. The method of claim 30, including the steps of:
providing a second disk surface; and,
writing the block of data to a data sector on the second disk surface.

35. A method for use in a disk drive having a disk surface divided into a plurality of zones, the method comprising the steps of:
measuring amplitudes of a plurality of automatic gain control (AGC) fields stored on the disk surface on a zone-by-zone basis;
storing, on the disk surface, calibrated values corresponding to each zone based upon the measured amplitudes;
receiving a write command to write a block of data in a first of said plurality of zones;
measuring an amplitude of an AGC field in the first of said plurality of zones in response to the write command;
comparing the measured amplitude to a calibrated value corresponding with the first of the plurality of zones;
determining whether the measured amplitude is within a predetermined tolerance in comparison to the calibrated value corresponding with the first of the plurality of zones;
writing the block of data onto the disk surface in a data sector associated with the AGC field in the first of said plurality of zones before the disk surface completes one revolution after measuring the measured amplitude regardless of whether the measured amplitude is within the predetermined tolerance; and,
reading the block of data written onto the disk surface after the disk surface completes the one revolution and before the disk surface completes two revolutions after measuring the measured amplitude and performing a write verification on the block of data read from the disk surface if the measured amplitude is outside of the predetermined tolerance.

36. The method of claim 35 including the steps of:
receiving a write command to write a block of data in a second of said plurality of zones;
measuring an amplitude of an AGC field in the second of said plurality of zones in response to the write command; and,
comparing the measured amplitude of the AGC field in the second of said plurality of zones to a calibrated value corresponding with the second of the plurality of zones.

37. The method of claim 36, wherein the first of said plurality of zones is a single track and the second of said plurality of zones is a single track.

38. The method of claim 35, wherein said calibrated values corresponding to each zone are an average of the measured amplitudes corresponding to each zone.

39. The method of claim 35, wherein the calibrated values corresponding to each zone are used as initial values for running averages of amplitudes of AGC fields corresponding with each of said plurality of zones.

40. The method of claim 39, wherein the running averages corresponding with each of said plurality of zones are made up of a predetermined number of samples of amplitudes of AGC fields within their corresponding zones.

41. The method of claim 35, including writing the block of data onto the disk surface in the data sector while comparing the measured amplitude to the calibrated value.

42. The method of claim 35, including writing the block of data onto the disk surface in the data sector after comparing the measured amplitude to the calibrated value.

43. The method of claim 35, including writing the block of data onto the disk surface in the data sector slightly after comparing the measured amplitude to the calibrated value.

* * * * *